United States Patent [19]

Picco

[11] Patent Number: 4,706,209
[45] Date of Patent: Nov. 10, 1987

[54] ARITHMETIC AND LOGIC UNIT WITH OVERFLOW INDICATOR

[75] Inventor: André Picco, Le Peage de Vizille, France

[73] Assignee: Societe pour l'Etude et la Fabrication de Circuit Integres Speciaux-E.F.C.I.S., Grenoble, France

[21] Appl. No.: 696,910

[22] Filed: Jan. 31, 1985

[30] Foreign Application Priority Data

Feb. 3, 1984 [FR] France ................ 84 01694

[51] Int. Cl.⁴ .............................. G06F 7/50
[52] U.S. Cl. ............................... 364/745
[58] Field of Search .................. 364/745, 737

[56] References Cited

U.S. PATENT DOCUMENTS 4,215,415 7/1980 Kanemasa et al. ............. 364/745
4,592,008 5/1986 Nopper ........................ 364/745

OTHER PUBLICATIONS

Nguyen, "Practical Hardware Solutions for 2's Complement Arithmetic Problems" *Computer Design* Jul., 1979, pp. 105-112.

IBM Technical Disclosure Bulletin, vol. 19, No. 8, Jan. 1977, New York (U.S), East et al. "Overflow Indication in Two's Complement Arithmetic" pp. 3135-3136.

*Primary Examiner*—David H. Malzahn
*Attorney, Agent, or Firm*—Oblon, Fisher, Spivak, McClelland & Maier

[57] ABSTRACT

The invention concerns the overflow test circuit of an arithmetic and logic unit. The circuit described does not require receiving an indication on the operating in addition or subtraction of the ALU; it receives simply the carrying input the carrying and the result output of the cell of the highest rank of the ALU: and it supplies a positive overflow signal or a negative overflow signal, when the result of the addition or subtraction of two numbers exceeds the capacity of the ALU. Two gates with three inputs and three inverters are sufficient to establish the overflow test circuit.

4 Claims, 2 Drawing Figures

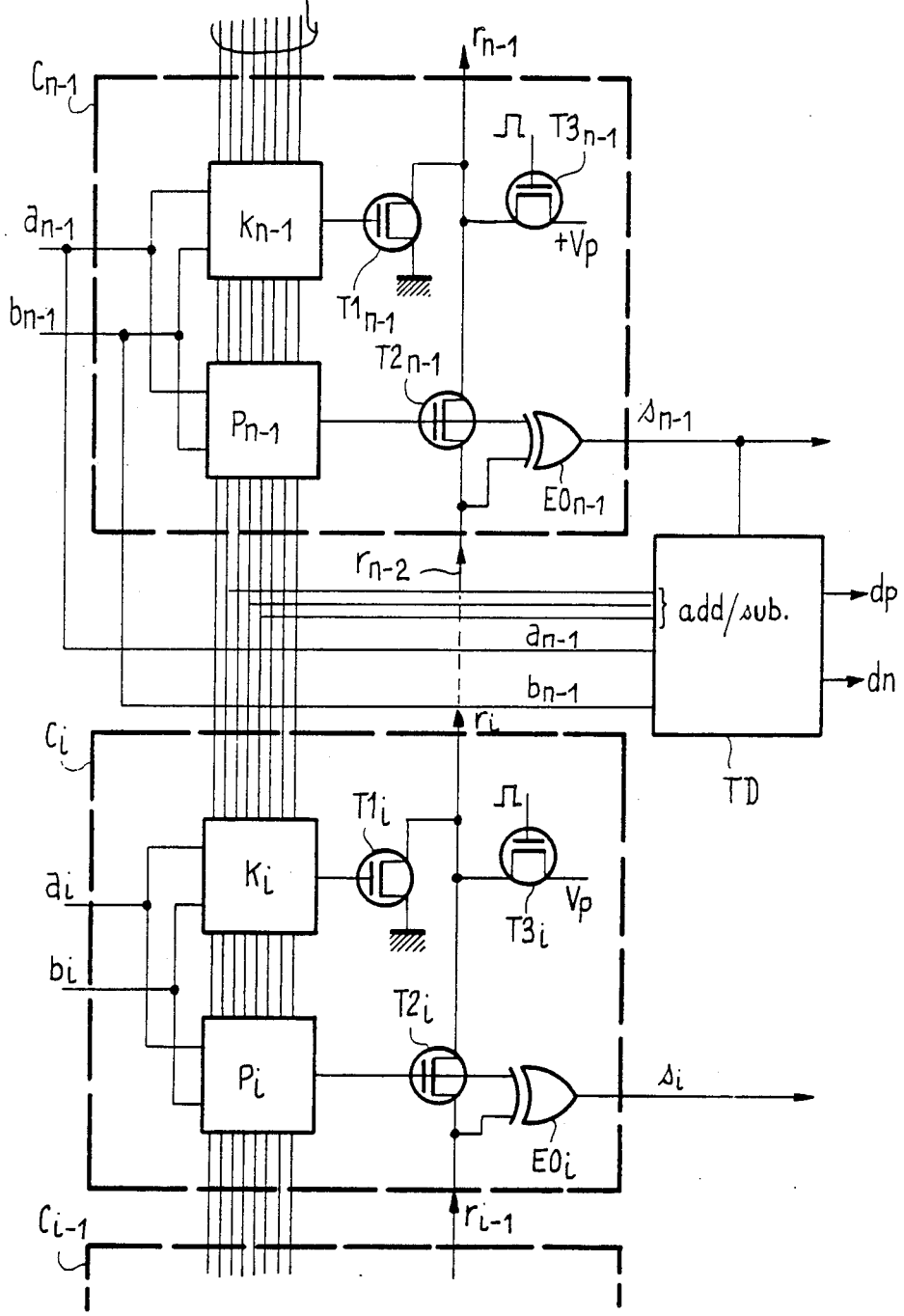

FIG_2
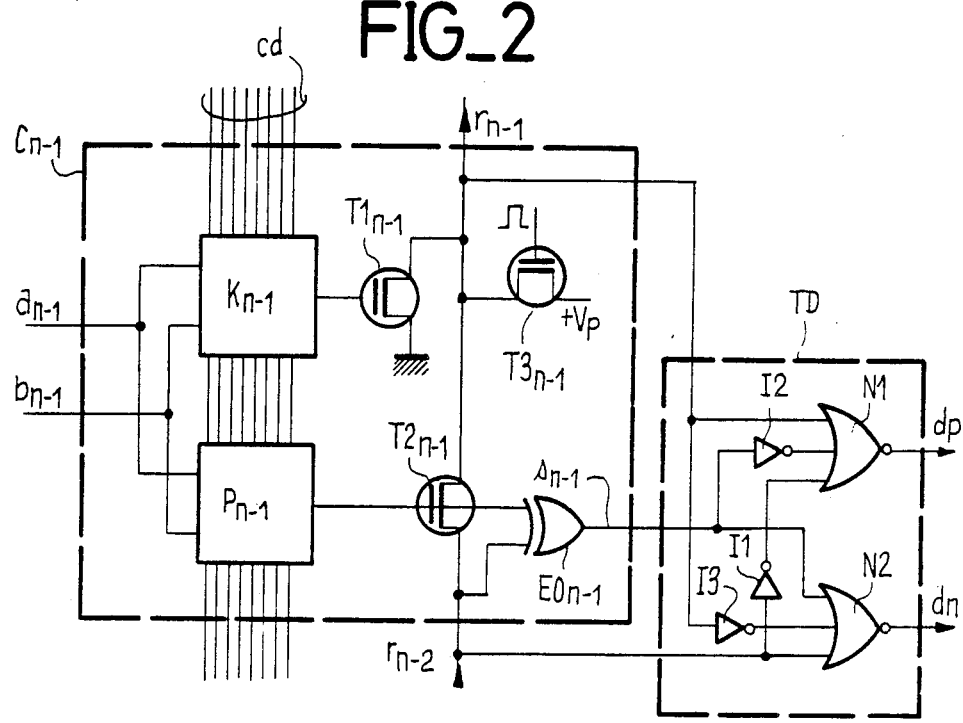
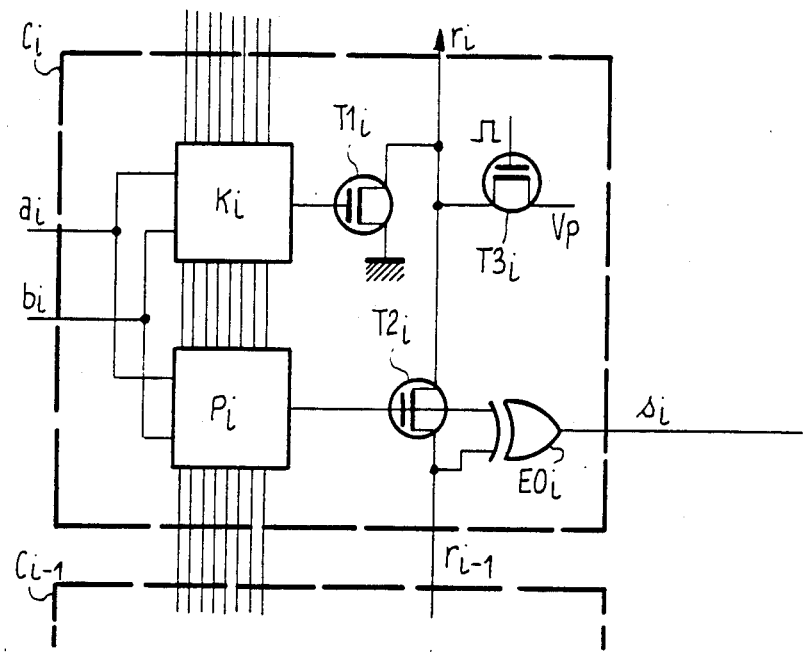

ARITHMETIC AND LOGIC UNIT WITH OVERFLOW INDICATOR

BACKGROUND OF THE INVENTION

The present invention concerns an arithmetic and logic unit such as those which are utilized in microprocessors or other circuits for processing binary signals.

An arithmetic and logic unit is intended to receive two binary numbers of several digits and to carry out on these numbers simple arithmetic type operations (the addition or subtraction of two numbers) or logic type operations (complementation, OR function, etc.). It is constituted by a succession of switching cells each receiving a binary number or bit of one of the numbers to be processed and a binary number or bit of the other number; control conductors, for example eight in number, control the switching cell according to the arithmetic or logic function to be carried out, in such a way as to switch onto the output of each cell one or other of the bits, or their complement, or again a "zero" bit or "one" bit, according to the function to be carried out.

A constitution example of an arithmetic and logic unit (ALU) is represented in FIG. 1.

The ALU comprises a succession of n cells $C_o$ to $C_{n-1}$ in order to process numbers A and B each of n bits, $a_o$ to $a_{n-1}$ and $b_o$ to $b_{n-1}$, the more significant bits $a_{n-1}$ and $b_{n-1}$, processed in the cell of rank n-1, being sign bits of numbers A and B.

The bits of rank i, $a_i$ and $b_i$ respectively, are applied to the input of cell $C_i$ of rank i.

Each cell $C_i$ comprises two switching elements $K_i$ and $P_i$ each receiving bit $a_i$ and bit $b_i$ and eventually their complements $\bar{a}_i$ and $\bar{b}_i$, if these complements are not generated inside the elements themselves.

Elements $K_i$ and $P_i$ of the various cells are all controlled simultaneously by common control conductors, for example, eight in number, grouped together in a control bus designated by reference cd. The state of the signals on the various control conductors defines the arithmetic or logic function carried out by the ALU and this function becomes apparent by the appearance at the output of each switching element of a signal that can be $a_i$ or $b_i$ or $\bar{a}_i$ or $\bar{b}_i$ or 0 or 1.

Each cell $C_i$ comprises, apart from the inputs for numbers $a_i$ and $b_i$, a carrying input designated by $r_{i-1}$, connected to the carrying output, also designated by $r_{i-1}$, of the cell of the immediately preceding rank $C_{i-1}$.

Cell $C_i$ comprises furthermore a result output $S_i$ and q carrying output $r_i$ adapted to be connected to the input of the cell of the following rank $C_{i+1}$.

In the example represented, the output of switching element $K_i$ controls a field effect transistor $T1_i$ connected between carrying output $r_i$ and a mass (logic level 0). Switching output element $P_i$ is connected, on the one hand, to the control grid of a transistor $T2_i$ connected between carrying input ($r_{i-1}$) and carrying output ($r_i$). Furthermore, switching output element $P_i$ is connected to an input of an exclusive OR gate $EO_i$, the other input of which is connected to carrying input $r_{i-1}$ and the output of which constitutes result output $S_i$ of cell $C_i$.

Furthermore, a transistor $T3_i$, connected between carrying output $r_i$ and a power supply $V_p$, acting to ensure a precharge of the circuit in a first operating phase of the ALU during which this transistor is rendered conductor.

Generally, it is required to know, when the ALU operates as an adder or a subtractor, if the addition or subtraction capacity of the ALU has not overflowed. Indeed, input numbers A and B are numbers bearing a sign the most significant bit of which ($a_{n-1}$ or $b_{n-1}$) represents the sign, positive if it is zero, negative if it is equal to 1; the output of the ALU is equally a number bearing a sign of which the most significant bit $s_{n-1}$ (output of cell $C_{n-1}$ of the most significant rank) represents the sign of the addition or subtraction result. It is possible that the addition of two positive numbers gives a positive result equal to or higher than $2^{n-1}$, in which case sign bit $s_{n-1}$ will become equal to 1, which would then be interpreted as a negative result; if the capacity of the ALU is exceeded, it is known as positive overflow. It is also possible that the addition of two negative numbers give a negative result lower than $-2^{n-1}$, in which case sign bit $s_{n-1}$ will become equal to 0, and the result supplied by the ALU, interpreted as a positive number, will obviously be incorrect: there is again capacity overflow, that will be known as negative overflow.

Furthermore, positive overflow is possible in the case of A-B subtraction where A is positive and B is negative and a negative overflow is possible in the case of A-B subtraction where A is negative and B positive.

The arithmetic and logic units are thus generally provided with an overflow test circuit, represented under general reference TD, which elaborates a positive overflow signal and a negative overglow signal dn.

These signals are utilized by the processor or microprocessor, the ALU of which forms the body; for example, these signals are registered at specific positions of a state register comprising furthermore other indications on the state of the processor.

In practice, if the detail of the overflow test circuit, it will be observed that it is usually elaborated from following comments $a_{n-1}$, $b_{n-1}$ and $s_{n-1}$ being the sign bits of numbers A and B and of the result S of the addition or the subtraction A and B:

1. in the addition mode
   (a) if A and B are positive ($a_{n-1}=b_{n-1}=0$) and if S is negative ($s_{n-1}=1$), there is positive overflow: dp=1; it is possible to write logic equation:

$$dp = \bar{a}_{n-1}\bar{b}_{n-1}s_{n-1} \qquad (1)$$

(b) if A and B are negative ($a_{n-1}=b_{n-1}=1$) and if S is positive ($s_{n-1}=0$), there is negative overflow: dn=1; it is possible to write the logic equation:

$$dn = a_{n-1}b_{n-1}\bar{s}_{n-1} \qquad (2)$$

2. A-B subtraction mode
   (a) if A is positive and B negative ($a_{n-1}=0; b_{n-1}=1$) and if S is negative ($s_{n-1}=1$), there is positive overflow: dp=1; it is possible to write the logic equation:

$$dp = \bar{a}_{n-1}b_{n-1}s_{n-1} \qquad (3)$$

(b) if A is negative and B positive ($a_{n-1}=1; b_{n-1}=0$) and if S is positive ($s_{n-1}=0$), there is negative overflow dn=1; it is possible to write the logic equation:

$$dn = a_{n-1}\bar{b}_{n-1}\bar{s}_{n-1} \quad (4)$$

It will be noted that the logic equation (1) and (3) are not identical, in the same way as equations (2) and (4). It is thus in priority necessary to establish overflow signals separately for the case where the ALU carries out an addition, and for the case where it carries out a subtraction. Test circuit TD must therefore receive:
sign bit $a_{n-1}$ of A
sign bit $b_{n-1}$ of B
sign bit $s_{n-1}$ of result S
an indination on the work mode, ALU addition or subtraction.

This latter indication originates from one or several control bus conductors cd of the ALU.

Other than the fact that it is necessary to foresee bringing to the test signals circuit of the control bus of the ALU, it is thus necessary to provide a logic circuit of several gate levels: a first level of inverters in order to realize the complements $\bar{a}_{n-1}$, $\bar{b}_{n-1}$, $\bar{s}_{n-1}$, four gates with three inputs at least to realize the various products appearing in logic equations (1) and (4) and gates to select adequate products in function of the control bus state cd.

In order to reduce the number of gates necessary and above all the number of successive stages of gates in order to accelerate the obtention of overflow date, the present invention proposes an arithmetic and logic unit having an overflow test circuit that possesses three inputs respectively connected to the carrying input of the cell of the highest rank of the arithmetic and logic unit, at the carrying output of this cell, and finally the result output of this cell.

This circuit essentially comprises, other than the inverters in order to establish the complement of the signals applied to these inputs, a single gate of three inputs for each overflow date to be established (i.e. two gates if positive overflow date and negative overflow date is required).

BRIEF DESCRIPTION OF THE DRAWINGS

Other objects, features and advantages of the invention will appear from reading through the following detailed description that is given with reference to the appended figures in which:

FIG. 1 which has already been described, represents an arithmetic and logic unit of the background of the art;

FIG. 2 represents the arithmetic and logic unit according to the invention.

In FIG. 2, the same references represent the same items as those of FIG. 1 which will not be described again. The structure of the ALU represented furthermore only constitutes one embodiment among other possible embodiments.

Overflow test circuit TD of FIG. 2 does not receive a conductor bus issuing from control bus cd indicating the function carried out by the ALU. Consequently, the overflow test circuit does not receive any direct information due to the fact that the ALU carries out an addition rather than a subtraction.

Circuit TD only receives three input signals which are respectively the signal present at the carrying input $r_{n-2}$ of the last cell $C_{n-1}$ of the ALU and the signals present at the carrying circuit $r_{n-1}$ and result output $s_{n-1}$ of this same cell (of which it will be recalled, it receives sign bits $a_{n-1}$ and $b_{n-1}$ of numbers A and B to be added or subtracted).

Circuit TD further supplies a positive overflow signal dp and a negative overflow signal dn.

These output signals of circuit TD are logic signals connected to input logic signals by the following equations:

$$dp = r_{n-2} \cdot s_{n-1} \cdot \bar{r}_{n-1} \quad (5)$$

and $$dn = \bar{r}_{n-2} \cdot \bar{s}_{n-1} \cdot r_{n-1} \quad (6)$$

With this purpose, circuit TD can comprise three inverters 11, 12, 13 supplying respectively complements of $r_{n-2}$, $s_{n-1}$ and $r_{n-1}$, and two gates of three inputs in order to establish the products of equations (5) and (6).

In FIG. 2, the gates are NOR N1 and N2, gate N1 receives $\bar{r}_{n-2}$, $s_{n-1}$ and $r_{n-1}$ and supplies dp; gate N2 receives $r_{n-2}$, $\bar{s}_{n-1}$ and $\bar{r}_{n-1}$ and supplies dn.

Circuit TD is thus very simple and only comprises one stage of three input gates, very rapidly supplying overflow indications dp and dn.

The elaboration of signals dp and dn no longer depends upon the operation (addition or subtraction) carried out.

The capacity overflow cases are in fact the following:
1. Addition
(a) A and B being positive, a negative result is nevertheless obtained:

$$a_{n-1}=0;\ b_{n-1}=0;\ s_{n-1}=1$$

This is only possible if $r_{n-2}=1$ and $r_{n-1}=0$
The following logic equation is achieved:

$$dp = r_{n-2}s_{n-1}\bar{r}_{n-1} \quad (7)$$

(b) A and B being negative, a positive result is nevertheless obtained:

$$a_{n-1}=1;\ b_{n-1}=1,\ s_{n-1}=0$$

This is only possible if $r_{n-2}=0$ and $r_{n-1}32\ 1$
The following is achieved:

$$dn = \bar{r}_{n-2}\bar{s}_{n-1}r_{n-1} \quad (8)$$

2. A-B Subtraction
(a) A positive, B negative, a negative result is obtained.

$$a_{n-1}=0;\ b_{n-1}=1,\ s_{n-1}=1$$

This is only possible if $r_{n-2}=1$ and $r_{n-1}=0$
The following is achieved:

$$dp = r_{n-2}s_{n-1}\bar{r}_{n-1} \quad (9)$$

(b) A being negative and B being positive, a positive result is obtained:

$$a_{n-1}=1;\ b_{n-1}=0,\ s_{n-1}=0$$

This is only possible if $r_{n-2}=0$ and $r_{n-1}=1$.
The following is achieved:

$$dn = \bar{r}_{n-2} \bar{s}_{n-1} r_{n-1} \quad (10)$$

It is checked that logic equations (7) and (9) on the one hand (positive overflow) and (8) and (10) on the other hand (negative overflow) are identical. The overflow test need not therefore intervene due to the fact that the ALU carries out an addition or a subtraction.

I claim:

1. Arithmetic and logic unit comprising:
    a plurality of switching cells each cell being capable of performing addition and having the rank i, where i=1, 2, ... (i+1) ... (n−1), in which the rank (n−1) is the highest;
    a control bus with each cell being connected to said control bus so as to be simultaneously controlled in order to define a determined arithmetic or logic operating mode of the unit, in which:
    a cell of rank i has an input to receive a bit of rank i of a first number A, an input to receive a bit of the same rank i of a second number B, and has an output for a carry and for a result;
    a cell of rank i+1 having its carry input connected to the carry output of the cell having the rank i;
    a cell of highest rank receiving on its cell inouts a sign bit of the first number B and a sign bit of the second number B;
    and an overflow test circuit for supplying a positive overflow signal and a negative overflow signal, wherein the overflow test circuit comprises three inputs respectively connected to the carry output of the highest ranking cell and to the carry and result outputs of said highest ranking cell.

2. Arithmetic and logic unit according to claim 1, wherein the overflow test circuit comprises:
    a gate having three inputs and one output, this gate establishing the following logic product:

$$dp = r_{n-2} \cdot s_{n-1} \cdot \overline{r_{n-1}},$$

wherein
    dp is a positive overflow signal delivered at the output.

3. Arithmetic and logic unit according to claim 1, wherein the overflow test circuit comprises:
    a gate having three inputs and one output, establishing the following logic product:

$$dn = \overline{r_{n-2}} \cdot \overline{s_{n-1}} \cdot r_{n-1},$$

wherein
    dn is a negative overflow signal delivered at the output.

4. Arithmetic and logic unit according to claim 1, wherein the overflow test circuit comprises: two gates with three inputs and three inverters in order to establish the following logic products:

$$dp = r_{n-2} \cdot s_{n-1} \cdot \bar{r}_{n-1}$$

and $$dn = \bar{r}_{n-2} \cdot \bar{s}_{n-1} \cdot r_{n-1}$$

on two distinct outputs of the circuit.

* * * * *